US010565785B2

(12) United States Patent
Baillie

(10) Patent No.: US 10,565,785 B2
(45) Date of Patent: Feb. 18, 2020

(54) DYNAMIC DISPLAY OF OBJECTS WITHIN A VIRTUAL WORLD BY OCTREE-BASED PARTITIONING AND PUBLISH/SUBSCRIBE COMMUNICATION

(71) Applicant: NOVAQUARK, Paris (FR)

(72) Inventor: Jean-Christophe Baillie, Paris (FR)

(73) Assignee: NOVAQUARK, Paris (FR)

(\*) Notice: Subject to any disclaimer, the term of this patent is extended or adjusted under 35 U.S.C. 154(b) by 0 days.

(21) Appl. No.: 16/362,496

(22) Filed: Mar. 22, 2019

(65) Prior Publication Data
US 2019/0295317 A1 Sep. 26, 2019

(30) Foreign Application Priority Data

Mar. 22, 2018 (EP) ..................... 18305318

(51) Int. Cl.
*G06T 17/00* (2006.01)
*G06T 11/00* (2006.01)
*H04L 29/06* (2006.01)
*H04L 29/08* (2006.01)
*H04W 84/04* (2009.01)

(52) U.S. Cl.
CPC ............ *G06T 17/005* (2013.01); *G06T 11/00* (2013.01); *H04L 67/18* (2013.01); *H04L 67/38* (2013.01); *G06T 2200/16* (2013.01); *G06T 2210/08* (2013.01); *G06T 2210/61* (2013.01); *H04L 67/26* (2013.01); *H04W 84/042* (2013.01)

(58) Field of Classification Search
CPC ........ G06T 17/005; H04L 67/18; H04L 67/26
See application file for complete search history.

(56) References Cited

U.S. PATENT DOCUMENTS

| 6,767,287 | B1 | 7/2004 | Mcquaid et al. |
| 7,893,936 | B2 * | 2/2011 | Shearer ................... G06T 15/06 345/420 |
| 2003/0198404 | A1 * | 10/2003 | Frisken ................... G06T 17/10 382/285 |

(Continued)

OTHER PUBLICATIONS

Gauthierdickey, C., et al., "Using n-trees for scalable event ordering in peer-to-peer games," Proceedings of the 15th International Workshop on Network and Operating Systems Support for Digital Audio and Video 2015, Stevenson, WA, pp. 87-92.

(Continued)

*Primary Examiner* — Grace Q Li
(74) *Attorney, Agent, or Firm* — Kenealy Vaidya LLP

(57) ABSTRACT

Some embodiments are directed to a method for dynamic display of objects of a virtual world to a user associated with an observer located within the virtual world, including the observer, determining a first octree structuring the virtual world, and constituting a first partition based on this octree, and a set of subscriptions to each cell of the partition
Determining for each object a container to which it is attached.
Determining, for each container and for said observer, a second octree structuring the container, and constituting a second partition based on said second octree, and a set of subscriptions to each cell of this partition.
Defining for each object, columns comprising a hierarchy of nodes determined by a height parameter.
Each of the objects publishing events associated with each nodes of the column with a frequency decreasing with its height.

13 Claims, 2 Drawing Sheets

(56) References Cited

U.S. PATENT DOCUMENTS

2010/0146128 A1 6/2010 Kulkarni et al.
2015/0321101 A1* 11/2015 Rosedale .............. A63F 13/355
463/30

OTHER PUBLICATIONS

Chen, J., et al., "G-COPSS: A content centric communication infrastructure for gaming applications," Local & Metropolitan Area Networks (LANMAN), 2011 18th IEEE Workshop on, IEEE, Oct. 13, 2011, pp. 1-6.

Lui, J. C. S., et al., "An Efficient Partitioning Algorithm for Distributed Virtual Environment Systems," IEEE Transactions on Parallel and Distributed Systems, IEEE Service Center, Los Alamitos, CA, US, vol. 13, No. 3, Mar. 1, 2002, pp. 193-211.

Carter, C., et al., "A Survey of AoIM, Distribution and Communication in Peer-To-Peer Online Games," Computer Communications and Networks (ICCCN), 2012 21st International Conference on, IEEE, Jul. 30, 2012, pp. 1-5.

Kumar, S., et al., "CarSpeak," Applications, Technologies, Architectures, and Protocols for Computer Communication, ACM, New York, NY, US, Aug. 13, 2012, pp. 259-270.

Minghe, Y., et al., "Efficient Filtering Algorithms for Location-Aware Publish/Subscribe," IEEE Transactions on Knowledge and Data Engineering, IEEE Service Center, Los Alamitos, CA, US, vol. 27, No. 4, Apr. 1, 2015, pp. 950-963.

Arantes, L., et al., "Enhanced DR-Tree for Low Latency Filtering in Publish/Subscribe Systems," Advanced Information Networking and Applications (AINA), 2010 24th IEEE International Conference on, IEEE, Piscataway, NJ, US, Apr. 20, 2010, pp. 58-65.

Search Report for European Patent App. No. 18305318 (dated Sep. 21, 2018).

* cited by examiner

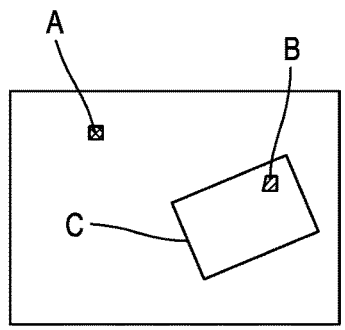
FIG. 1
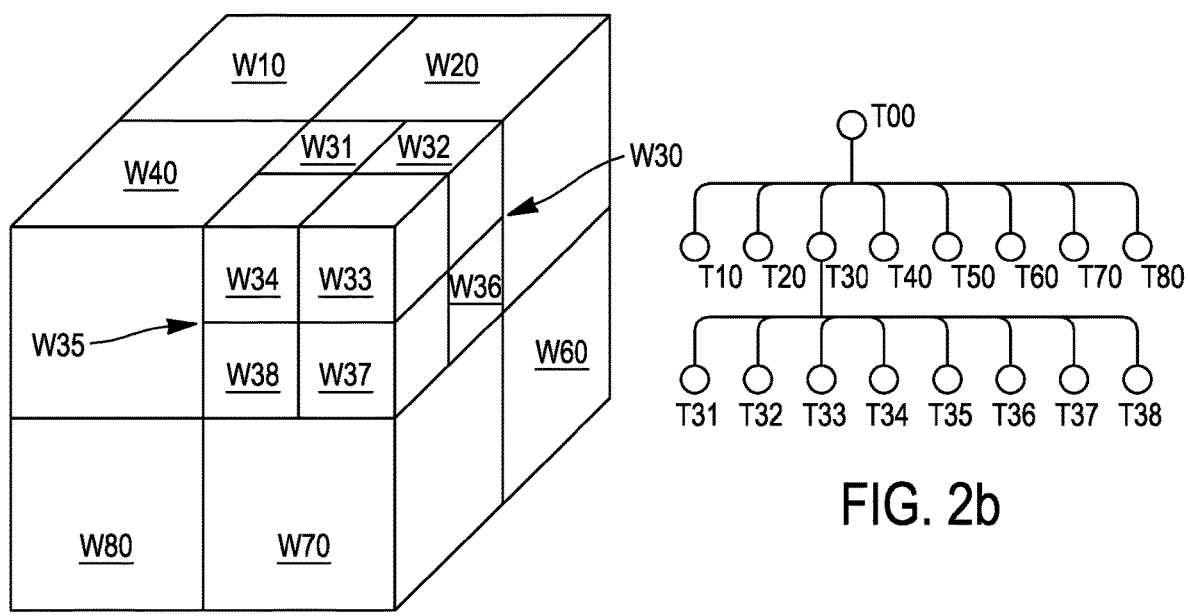
FIG. 2a
FIG. 2b
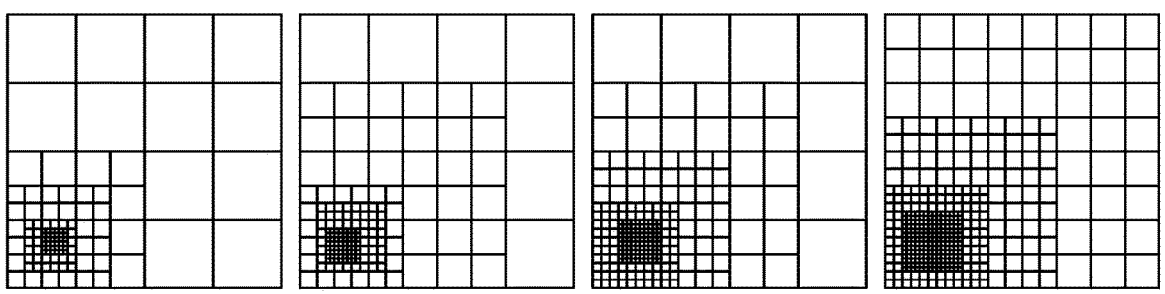
FIG. 4a    FIG. 4b    FIG. 4c    FIG. 4d

DYNAMIC DISPLAY OF OBJECTS WITHIN A VIRTUAL WORLD BY OCTREE-BASED PARTITIONING AND PUBLISH/SUBSCRIBE COMMUNICATION

CROSS REFERENCE TO RELATED APPLICATION(S)

This application claims the priority benefit under 35 U.S.C. § 119 of European Patent Application No. 18305318.0, filed on Mar. 22, 2018, the content of which is hereby incorporated by reference in its entirety.

BACKGROUND

Some embodiments are directed to dynamic display of objects within a virtual world, and in particular, applies in virtual worlds wherein the number of objects is high and their information (like actual locations) should be constantly updated.

Virtual worlds are environments simulated by computers, wherein users can create personal avatars and interact with each other and with the environments.

These worlds may be designed for games, but also for other purposes. For instance, the users of such virtual environments may simply enjoy the experience of being immersed in a new virtual world and/or to interact with other users, create things, explore or to pursue other personal goals.

The users interact with the simulated virtual world through man-machine interfaces, like computer or virtual-reality systems, whereas the simulating computers may be located in remote locations. In addition, the users may be located in different premises, so that the information regarding the virtual world should be transmitted through telecommunication networks.

As the avatar may move within the virtual world, the perceived environment should be constantly updated. What's more, as the avatars may see each other in the virtual world, and as they may move constantly, the current location of each avatar should be transmitted to each other avatar, so as to have them update the display of the environment.

In addition, in order to make the users have a good experience of the interactions with the virtual world, the updates should be frequent enough.

In consequence, the amount of information to be transmitted throughout the telecommunication networks increases dramatically when the number of moving objects (avatars . . . ) within the virtual world is important.

In addition, in order to make the users have a good experience of the interactions with the virtual world, the updates should be frequent enough, for instance 10 times per seconds. A lower figure may give the feeling of freezing objects, jerky movements or even inconsistencies in the relative locations of objects.

In other words, if K is the number of avatars, the broadcasting of updates to users is a $K^2$ complexity problem to be addressed at, for instances, a 10 times/seconds frequency. It is clear that such a problem does not scale when the number of users increase, especially if each user can manage several moving objects.

Several solutions have been proposed to address this problem of scalability.

In many cases, the number of objects and/or users are limited. When new users want to join the virtual world, a new instance of the virtual world is created. Each user then belongs to a particular instance of the world, and the information are transmitted independently between users of each instance. Such a solution allows to limit the number of objects to manage and, consequently, the amount of information to be broadcast among users. However, it isolates users within a particular instance from other users in other instances, which is a strong limitation to possible use cases of such virtual worlds.

SUMMARY

Some embodiments of the presently disclosed subject matter alleviate at least partly the above-mentioned drawbacks.

Some embodiments are therefore directed to a method for dynamic display of objects of a virtual world to a user associated with an observer located within the virtual world, including:
for the observer, determining a first octree structuring the volume of the virtual world, and constituting a first partition of the virtual world based on the first octree, wherein the size of the cells depends on their distance to the observer, and a set of subscriptions of the observer to channels corresponding to each cell of the first partition;
  determining for each object a container object to which it is attached;
  determining, for each container object and for the observer, a second octree structuring a volume of the container object, and constituting a second partition of the container object based on the second octree, wherein the size of the cells depends on their distance to the observer; and a set of subscriptions to channels corresponding to each cell of the second partition for the observer;
  defining for each object, respective columns as a walk through the second octree starting with the node corresponding to the cell of minimal size to which the objects belong and upward until a height parameter is reached;
  each of the objects publishing information including its current location, as events in channels associated with each nodes of the respective column with a frequency decreasing with its height within the column;
  the observer dynamically receiving the events, according to the subscriptions and updating the display according to received events.

Some embodiments include one or more of the following features, which can be taken separately or together, either in partial combination or in full combination:
  the first and second partitions are constituted by starting with a single cell corresponding to the container object; and recursively splitting a cell when the ratio between the size of the cell by its distance to the observer is above a given threshold;
  updating the display includes projecting the updated location of the respective objects to a 2D plane associated with a point of view of the observer, for display on a 2D screen to the user;
  the frequency fk for a cell of the column at a layer k for a given object is given by: $f_k = \frac{1}{4_k} \cdot f(B)$, wherein k=0 corresponds to the leaves of the second octree, and f(B) is a base frequency for the object, B;
  the cell of minimal size to which the object belongs depends on the size of the object, so that the object fits entirely within the cell, and in no smaller cell;
  the granularity of the second partition depends on the speed of the observer;

the observer is associated with an object representing the user for other users.

Some other embodiments of the presently disclosed subject matter are directed to a computer program having instructions to be executed by a processing platform for performing a method as previously defined.

Some other embodiments can include or can consist of a platform for dynamic display of objects of a virtual world to a user associated with an observer located within a container object of the virtual world, the user accessing the platform by a terminal device connected to the platform by a telecommunication network, the platform including:

means for determining, for the observer, a first octree structuring the volume of the virtual world, and constituting a first partition of the virtual world based on the first octree, wherein the size of the cells depends on their distance to the observer, and a set of subscriptions of the observer to channels corresponding to each cell of the first partition;

means for determining for each object a container object to which it is attached;

means for determining, for each container object and for the observer, a second octree structuring a volume of the container object, and constituting a second partition of the container object based on the second octree, wherein the size of the cells depends on their distance to the observer; and a set of subscriptions to channels corresponding to each cell of the second partition for the observer;

means for defining for each object, respective columns as a walk through the second octree starting with the node corresponding to the cell of minimal size to which the objects belong and upward until a height parameter is reached;

means for having each of the objects publishing information including its current location, as events in channels associated with each nodes of the respective column with a frequency decreasing with its height within the column;

means for having the observer dynamically receiving the events, according to the subscriptions and updating the display according to received events.

Some embodiments include one or more of the following features, which can be taken separately or together, either in partial combination or in full combination:

the platform includes a set of servers;

a virtual zone, corresponds to a cell among the cells of the first octree and is handled by a particular server among the set of servers;

the platform includes means for, when the load of a virtual zone is above a given threshold, the virtual zone is split into child virtual zones, each corresponding to child node of the node associated to the virtual zone in the first octree.

the height parameter depends dynamically on an assessment of the load of the platform.

Further features and advantages of the presently disclosed subject matter will appear from the following description of possible embodiments, given as non-limiting examples, with reference to the accompanying drawings listed hereunder.

BRIEF DESCRIPTION OF THE DRAWINGS

FIG. 1 shows a sample 2D virtual world.

FIGS. 2a and 2b show respectively a 3D virtual world and a possible partition thereof, and an associated octree, according to an illustrative embodiment of the invention.

FIGS. 4a, 4b, 4c, 4d show 4 different partitions of an object according to other embodiments of the invention.

DETAILED DESCRIPTION OF EXEMPLARY EMBODIMENTS

Figure 3A:
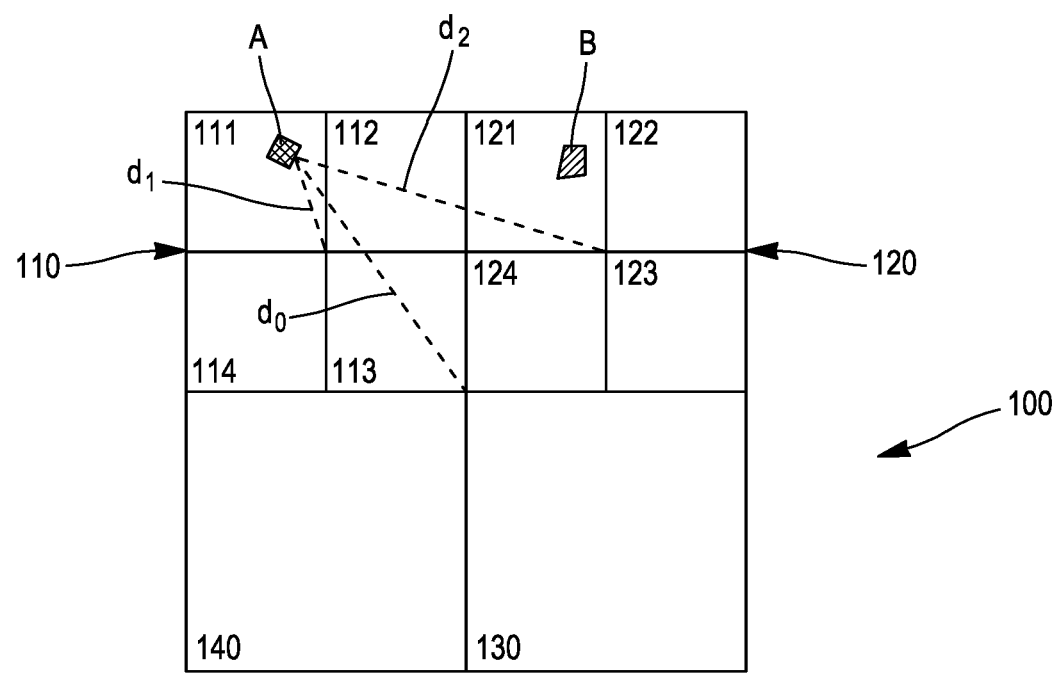
FIGS. 3a and 3b show respectively a 2D virtual world and a possible partition thereof, and an associated octree, according to another illustrative embodiment of the invention.

FIG. 1 shows a 2D virtual world. Some embodiments addresse both 2D and 3D virtual worlds, but for the purpose of clarity, illustrating figures will mostly be 2D representations. These 2D representations of virtual worlds should not be understood as limitations of the principles of some embodiments of the presently disclosed subject matter.

It includes 2 objects A, B. For example, A and B may be avatars of different users. It means that each user will perceive the environment from the point of view of their respective avatars A, B. In addition, both A and B are visible objects. In other words, A sees B and B sees A. According to the invention, an avatar can be considered both as an observer and an object. The observer can be considered as a point, and is not "seen" by itself by the other observers. The object has a volume and a geometrical shape and can therefore be seen by other observers.

More generally, some embodiments address a method for dynamic display of objects B, C (being avatars or not) from the point of view of an avatar A. The same process can be applied for another observer (e.g. B) which will then have another point of view and consider A as an object (instead of an observer).

Some objects C can be large enough to contain some other objects, B, and constitute respective sub-worlds, embedded inside the main virtual world. It should be noticed at this step that several levels of embeddings are possible, so that a world is embedded inside a world, itself embedded inside a world, etc.

A practical example of such an arrangement could be a virtual world representing a building embedded inside the world representing a planet, embedded inside the world representing the full universe.

It is then clear that, depending in the virtual world, the objects may be of different size and types: human beings, vehicles, fictional elements, planets, buildings, etc, some of which being able to represent virtual worlds containing objects. They may also have various relative speeds.

In the following, the recitations "container object" will be used to refer to such a sub-world. The description will consider such a container object containing at least one observer and at least one object (this object may be itself a container object or not). Accordingly, each observer is parented to a particular container object, which can be the top object of the hierarchy, i.e. the whole virtual world. By default, observers are parented to this top virtual world, but contacts with another object will "attach" them to this object and change their parentings.

In a similar way, each objects B is attached to a container object C. By default, this container object may be the top virtual world.

Each of these virtual worlds (or container objects) may be associated with a frame and a mesh, or lattice.

According to some embodiments, a first octree is determined, from the point of view of the observer A, to structure the volume of the virtual world. Based on this first octree, the virtual world can be partitioned, so that cells of the partition depends on their distance to this observers. The process to determine the octree and to constitute the partition will be explained below.

In addition, for each object B to consider, the container object C to which it is attached is determined.

According to the invention, for each container object C, and for each observer A, a second octree is determined to structure the volume of the container object, and a second partition is constituted based on the second octree, so that cells of the partition depends on their distance to this observers. The process to determine the octree and to constitute the partition will be explained below An octree is a data structure representing the container object as a hierarchical tree wherein each node of the tree corresponds to a particular zone (later called "cell") of the object and each of its children correspond to one of its octants. The deeper in the octree, the smaller are the corresponding zones. The top node of the octree corresponds to the whole container object.

FIG. 2 illustrate an example of an octree. The top node T00 corresponds to a whole virtual world W00. This virtual world can be divided into 8 octants, W10, W20, W30, W40, W50, W60, W70, W80. These octants are 8 cubic cells which forms a partition of this upper level space W00, around its geometric center.

Each of the octant corresponds to a respective children node of the octree, T10, T20, T30, T40, T50, T60, T70, T80.

In the example of the FIG. 2, only the octant W30 is itself subdivided in octants, or cells, W31, W32, W33, W34, W35, W36, W37, W38. These 8 cells correspond to nodes T31, T32, T33, T34, T35, T36, T37, T38 within the associated octree, which are children of the node T30.

This octree is thus a "partial" octree since not all the cells are subdivided down to the lower level. A partial octree can be considered as a subset of a full octree since it includes a subset of its nodes.

Further explanations on octree and octants can be found in the literature, e.g. within the Wikipedia online encyclopedia:

https://en.wikipedia.org/wiki/Octree
https://en.wikipedia.org/wiki/Octant_(solid_geometry)

Accordingly, one can get an octree representing the whole container object, with different resolutions, each corresponding to a layer of the octree.

According to some embodiments, for each container object and for each observer, an irregular partition of the volume of this object is constituted, so that cells close to the observer are smaller than cells far from it. An idea of the invention lies in considering larger cells for regions far from the observer and thinner cells around it. Accordingly, for each container object, a collection of partitions can be constituted, each for a different observer.

In order to constitute a partition for each container object (including for the whole virtual world), relative to the observer, a recursive split space partitioning process can be put in place.

According to this process, the partition of a particular object can be constituted by the following recursive process:
  starting with a single cell corresponding to the whole object space (which can also be the whole world, the world being considered as a special large object within which all observers are);
  recursively splitting a cell when the ratio between the size of this cell by its distance to the considered observer is above a given threshold.

This recursive process ends when there is no more cell matching the splitting criterion, i.e. when all the ratios between the size of all cells by their distance to the observer is below this given threshold.

At the end of this process, the whole container object is partitioned, so that the size of the cells increases when the distance from the observer increases.

The starting cell, corresponding to the whole container object, may for instance be the cubical volume minimally enclosing this object.

FIG. 3a illustrates this process on a 2D plane, which is then represented by a quadtree (equivalent of an octree in 2 dimensions). The cells represented in this figure corresponds to the nodes of a quadtree representing this 2D world.

An observer A is located inside a world 100.

A distance d0 between the center of this world 100 and the location of the observer A is computed. One assumes ratio between the size of the cell 100 and this distance is above a given threshold, which triggers the splitting of the world 100 into 4 cells 110, 120, 130, 140.

For each of these cells, a distance is computed between the center of the cell and the observer A. For instance, d2 represents the distance between the center of the cell 120 and d1 represents the distance between the center of the cell 110 and the observer A.

The ratio between the size of the cells and this distance d2 is assumed to be below the same given threshold, so that the cell 120 is not further split. The situation is the same for the cells 130 and 140.

However, it is assumed that the ratio between this size and the distance d1 is above the threshold (the size remains the same, but d1 is much smaller than d2). Then, this cell 110 is further split, into 4 smaller cells 111, 112, 113, 114.

For each of these cells, the ratio between their size and the distance between their center and the location of the observer A is computed. One assumes that this ratio is below the given threshold and, accordingly, the process terminates at this step. The 3-layer partition depicted on FIG. 3a is accordingly constituted.

It can be noticed that the generated partition is only dependent on the location of the observer A and on the given threshold.

FIGS. 4a, 4b, 4c, 4d represent 4 different partitions of a same 2D container object (and are therefore built on the base of a same octree) for a same observer A at a same location. The only differences between 4 partitions is the threshold.

This threshold can be set by the developer and designer of the virtual world, based on a set of parameters including the average size of the different objects, the type of application for the virtual world (action game, exploring game, etc.), the underlying networking and computing architectures and its load, the number of expected objects, etc. It may also depend on the accuracy (resolution) of the displaying means of the users.

According to some embodiments of the presently disclosed subject matter, this threshold may evolve dynamically over the time, e.g. according to this set of parameters, and in particular to the available bandwidth between the platform and the terminals, the 3D rendering capabilities, the speed of the observer, the density of objects in the area where the observer is standing.

Then, according to the presently disclosed subject matter, respective "columns" are defined for each objects B, based on the octree of the container object C on which it is attached.

The columns are herewith defined as a set of nodes of the second octree (i.e. a subpart of it) including the node corresponding to the cell of minimal size to which the object belongs and a hierarchy of nodes determined by a height parameter.

This hierarchy includes a succession of parents of this node. The number of parents is determined by a height parameter. It may also include nodes below the node corresponding to this cell of minimal size.

Figure 3B:
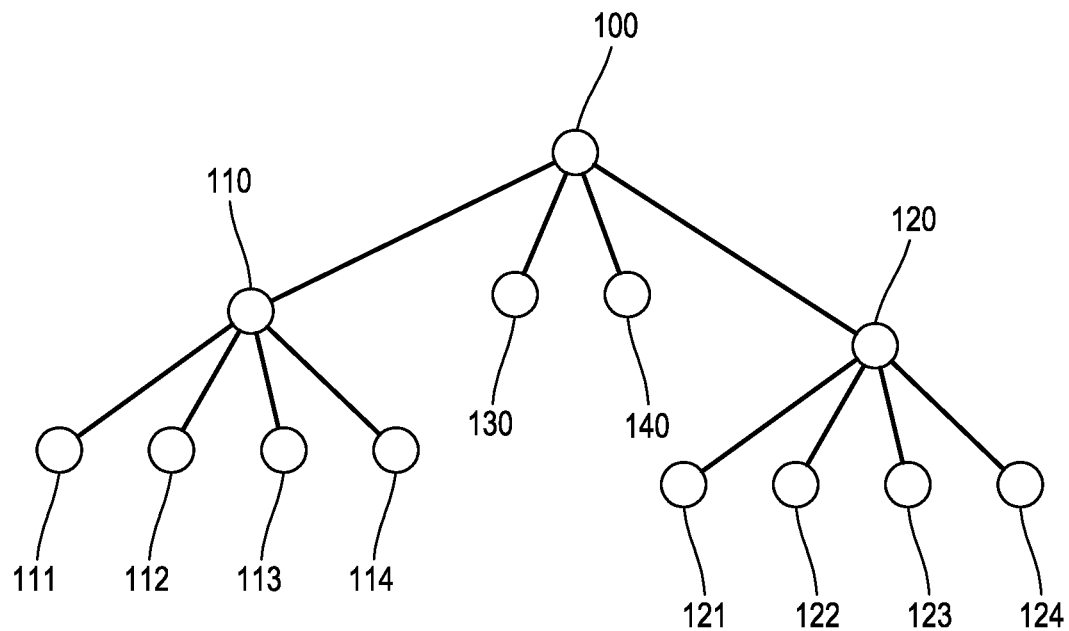

Getting back to the example of FIGS. 3a, 3b (which illustrate a 2D world, but can be generalized to a 3D world as well), the object B belongs to cells 121. In the octree, the node corresponding to this cell is a child of the node corresponding to cell 120, the parent of which being the node corresponding to cell 100 (which is the virtual world itself). Accordingly, the column for this object B may be [121; 120; 100], with a height parameter being 2 or more.

In other words, defining the column can include or can consist of in a walk through the octree starting from the node directly associated to the cell of the object upward until the height parameter is reached.

According to some embodiments of the presently disclosed subject matter, the transmission of information from objects to observers is performed through a publish/subscribe model.

According to such a model, the objects publish their information as events on channels, without knowing about the final recipients of the information, and the observers subscribe to channels, without also knowing about the initial emitters. In the present case, the "channels" correspond to the nodes of the octree.

The information published by the objects includes basically their locations, so as to make observers aware of their movement within the virtual world. However, according to some embodiments, this information may include other data, like any data representative of a change of the appearance of the object (color, size, shape . . . ), and which should be updated at the display of the observers.

Information related to the cells themselves may also be transmitted, like e.g. the geometry of the world in the corresponding volume.

According to some embodiments of the presently disclosed subject matter, the information of a given object is published as events associated with all cells of its respective column, but with a frequency which depends on the height of the cell (or node) within this column. The frequency is high for the cell corresponding directly to the object, and decreases as we consider cells of upper layers of the octree.

To take back the example of FIG. 3, the column for the object B is [121; 120; 100], Then, the object B publishes its updates in the channels associated to these three nodes/cells, with respective frequencies $f_{B121}$, $f_{B120}$, $f_{B100}$, so that $f_{B121} > f_{B120} > f_{B100}$.

In an embodiment, the frequency for the updates depend on the object itself and on the position of the cell in the column associated to the object; The "base" frequency may be set at a given value for all objects of the virtual world, or for a category of objects, and/or maybe mitigated with other parameters (load of the system, etc.), as it will be seen below.

Looking at FIG. 3a, one can note that such an arrangement involves that publications are more frequent in the vicinity of the object B, and less and less frequent as we move further from the location of object B.

The observers subscribe to channels corresponding to their respective partition (i.e. the partitions constituted on the first octrees), so as to dynamically receive the events associated to these cells.

As can be seen in following examples, the publish/subscribe mechanism combined with the publication of the objects limited to a certain height in their octree, involve that the observers will receive information from only a part of the objects present in the world. This part is determined notably by their distance and possibly by their size (which may influence directly the height parameter).

When the observer receives some information regarding an object through a channel to which it has subscribed, this can trigger the update of the actual display for the user associated with the observer.

This last step may include projecting the updated location of the respective objects to a 2D plane associated with a point of view of the observer, for display on a 2D screen to the user.

In situation where the user uses a virtual reality apparatus allowing to visualize the scene in 3D, no projections are put in place, but 3D geometric transformation taking into account the actual point of view of the observer (direction of observation, field of view and other optical parameters, etc.)

In the example of FIGS. 3a, 3b, we have seen already that object B publishes in the cell 121 with a frequency $f_{B121}$, in cell 120 with a lower frequency $f_{B120}$ and in the cell 100 with an even lower frequency $f_{B100}$.

Accordingly, depending on the location of the observer, it will receive updates according to frequency $f_{B121}$, according to frequency $f_{B120}$, with frequency $f_{B100}$, or no update.

For instance, if the observer is located in the cell 121, it will receive events on the channels of cells/nodes 121 with the frequency $f_{B121}$ If the observer is located in the cell 122, then, it will receive nothing from the channel associated to cell 122, but from the channel associated to cell 120, at a frequency $f_{120}$.

If the observer is located in the cell 111, it receives updates from the object B with frequency $f_{B100}$.

This simple example shows it clearly that, since $f_{B121} > f_{B120} > f_{B100}$, the further the observer A is from an object B, the less updates it receives.

As a consequence, according to some embodiments of the presently disclosed subject matter, a given observer receives updates with a high frequency from objects which are close to it, whereas the far away objects are less updated or not updated.

It is also apparent that it will receives frequent updates from a limited portion of the virtual world, and less frequent updates from a large portion of this virtual world.

This allows having real-time updates (1 to 1) for close objects (i.e. each update of an object is received by the observer for updating its display), and discarding many updates of far objects so as to dramatically limit the bandwidth needed for their transmission.

The figures for these frequencies may obey a rule dependent of the level within the octree. For instance, if k is the level in the octree, so that k=0 corresponds to its leaves, then one can design as a rule: $f_k = \frac{1}{4_k} \cdot f(B)$, wherein f(B) is a base frequency for the object B.

The height parameter of the column corresponds to a limit a visibility of the objects relative to observers. Indeed, when we consider the upper layers in the octree, they correspond to large and far regions of the world. So, it makes sense to set a limit beyond which an object is no more visible to an observer by limiting the max size of the publishing cell for this object's updates.

This visibility limit in distance corresponds within the octree by determining a height parameter for the definition of the column.

The columns are defined e.g. by a height and a base level, which corresponds to the level of the cell of minimal size which includes the considered object, within the octree of the container object.

This base level allows to address the diversity in size of the objects that may be present in the virtual world. This cell should completely contain the object. It means that if an object is too large to fit inside a cell of the lowest layer (leaves of the octree), it then corresponds to the parent cell. On the opposite, this cell should be minimal, in the meaning that no smaller cell can fully contain the object. Thus, this base level depends on the size of the object.

If the height is constant, it means that larger object will publish to higher levels in the octree, with the result that the object will be visible at larger distances, and that at a given distance within this visibility area, it will be updated at a higher frequency. In addition, the object may publish also at level below this base level.

The column includes a hierarchy of nodes above and below this base level. This hierarchy is determined by the height parameter in the upward direction. The frequency of publication for the nodes below the base level can be 1:1. Without this feature, when close to very large objects, observers would not receive information about them, because they would subscribe to cells smaller than the base level.

Furthermore, according to some embodiments of the presently disclosed subject matter, an object publishes only for the cells within its column of the octree of the container object. No publication is made for the other cells, and especially for cells "above" the top cell of the column.

Such a feature contributes further to the limitation of the data to be transmitted over the telecommunication network, without degrading the quality of the experience from a user perspective since the discarded updates would be not visible (or almost not visible) when displayed.

The height parameter can be influenced by the load of the platform handling the above-described computations. This load can be dynamically assessed so as to modify the height parameter in nearly real time.

For instance, starting to a default value (e.g. 3), the height parameter may be increased in case of underload, and decreased in case of overload.

When the height parameter is increased, according to an embodiment of the presently disclosed subject matter, the frequencies of the first lower layers may be made equal. For instance, $f_N = f_{N+1} = 1$, $f_{N+2} = \frac{1}{4}$, etc. wherein N is the layer of the cell of minimal size to which the object belongs.

According to an embodiment of the presently disclosed subject matter, in case of overload, instead of decreasing the height parameter, the latter is kept constant, but the publication starts below the layer N of the cell of minimal size to which the object belongs. In such case, the publication at this layer N may be made equal to 1, by cumulating the publication frequency $f_N$ with the publication frequencies at lower layers. For instance, if the publication starts one layer below, the publication frequency at the layer N may be made equal to 1 by cumulating $f_N = \frac{1}{4}$ with $f_{N-1} = \frac{3}{4}$ for the subpart of layer N which corresponds to layer N−1. For the other nodes, the frequency will be $f_N = \frac{3}{4}$.

Let's come back to FIGS. 3a/3b, and take the example of a height parameter of 1.

It means that object B publishes in cell 121 with a frequency $f_{B121} = 1$, and in cell 120 with a frequency $f_{B120} = \frac{1}{4}$. It does not publish in cell 100. Consequently, an observer A located in cell 111 cannot see it.

If one considers another object located in cell 121, but too large to fit in any of cells 121, 122, 123, 124. It will then publish in cell 120 with a frequency $f_{B120} = 1$, and in cell 100 with a frequency $f_{B100} = \frac{1}{4}$. Then the same observer located in cell 111 will see it and received a quarter of its updates.

According to an embodiment of the presently disclosed subject matter, the granularity of the partition depends on the speed of the observer. More precisely, this granularity is made coarser when the observer increases its speed.

According to an embodiment making use of the recursive split space partitioning method, previously described, this granularity can be tuned by directly setting the threshold which determines whether a cell should be further split or not according to the ratio between the size of this cell by its distance to the respective observer.

This threshold can be increased when the speed of the observer is increasing.

This implies that the perceived environment of the observer is expanded: the cells are larger around it, so that, statically, the amount of received information is decreased.

These above-mentioned computations can be handled by a computer platform. This platform can be centralized in a single physical location (e.g. a same room), or spread over several locations. The actual handling may be abstracted over a computer farm or over a cloud resource.

According to an embodiment of the presently disclosed subject matter, the handling is spread on a particular machine (or computer resource) of the clustered platform, in a transparent way from the application point of view. In other words, the actual spread of a computing task on a particular resource is handled by a platform managing function, which is independent of the method of the presently disclosed subject matter.

According to an embodiment of the presently disclosed subject matter, however, some virtual zones may be defined inside the virtual world, for dedicated load balancing.

A virtual zone may be defined as a particular cell of the virtual world, and each virtual zone is handled by a particular machine in the cluster platform.

Virtual zones can be inclusive to each other, and a policy may be defined for a given user to be managed by the smallest virtual zone that contains the location of the observer associated with the user.

These virtual zones allow to influence the underlying load balancing mechanisms by the knowledge and awareness of this load by the application. In particular, it allows to define regions of intensive load, within large areas of relatively low load, so as to devote some particular machines to them.

Initially, the cluster starts with one single virtual zone, which covers the whole virtual world, and thus corresponds to the root node of the octree.

When the number of objects within the virtual zone increases and goes beyond a given threshold, the virtual zone is split and one or several virtual zones are created, corresponding to children nodes of the root node. Objects within these virtual zones are handled by the associated computing resources, and taken out of the control of the root virtual zone, lowering its load.

Similarly, when a given virtual zone's load falls below a given threshold, it is merged with its parent and is removed.

The presently disclosed subject matter has been described with reference to possible embodiments. However, many variations are possible within the scope of the presently disclosed subject matter.

The invention claimed is:

1. A method for dynamic display of objects of a virtual world to a user associated with an observer located within the virtual world, comprising:
   for the observer, determining a first octree structuring the volume of the virtual world, and constituting a first partition of the virtual world based on the first octree, wherein the size of the cells depends on their distance to the observer, and a set of subscriptions of the observer to channels corresponding to each cell of the first partition;

determining for each object a container object to which it is attached;

determining, for each container object and for the observer, a second octree structuring a volume of the container object, and constituting a second partition of the container object based on the second octree, wherein the size of the cells depends on their distance to the observer; and a set of subscriptions to channels corresponding to each cell of the second partition for the observer;

defining for each object, respective columns as a walk through the second octree starting with the node corresponding to the cell of minimal size to which the objects belong and upward until a height parameter is reached;

each of the objects publishing information including its current location, as events in the channels associated with each nodes of the respective column with a frequency decreasing with its height within the column;

the observer dynamically receiving the events, according to the subscriptions and updating the display according to received events.

2. The method according to claim 1, wherein the first and second partitions are constituted by:

starting with a single cell corresponding to the container object;

recursively splitting a cell when the ratio between the size of the cell by its distance to the observer is above a given threshold.

3. The method according to any of claim 1, wherein updating the display includes projecting the updated location of the respective objects to a 2D plane associated with a point of view of the observer, for display on a 2D screen to the user.

4. The method according to claim 1, wherein the frequency for a cell of the column at a layer k for a given object is given by: $f_k = \frac{1}{4_k} \cdot f(B)$, wherein k=0 corresponds to the leaves of the second octree, and f(B) is a base frequency for the object.

5. The method according to claim 1, wherein the cell of minimal size to which the object belongs depends on the size of the object, so that the object fits entirely within the cell, and in no smaller cell.

6. The method according to claim 1, wherein the granularity of the second partition depends on the speed of the observer.

7. The method according to claim 1, wherein the observer is associated with an object representing the user for other users.

8. The method according to claim 1, comprising a computer program having instructions to be executed by a processing platform.

9. A platform for dynamic display of objects of a virtual world to a user associated with an observer located within a container object of the virtual world, the user accessing the platform by a terminal device connected to the platform by a telecommunication network, the platform comprising:

means for determining, for the observer, a first octree structuring the volume of the virtual world, and constituting a first partition of the virtual world based on the first octree, wherein the size of the cells depends on their distance to the observer, and a set of subscriptions of the observer to channel corresponding to each cell of the first partition;

means for determining for each object (B) a container object to which it is attached;

means for determining, for each container object and for the observer, a second octree structuring a volume of the container object, and constituting a second partition of the container object based on the second octree, wherein the size of the cells depends on their distance to the observer; and a set of subscriptions to channels corresponding to each cell of the second partition for the observer;

means for defining for each object (B), respective columns as a walk through the second octree starting with the node corresponding to the cell of minimal size to which the objects belong and upward until a height parameter is reached;

means for having each of the objects publishing information including its current location, as events in channels associated with each nodes of the respective column with a frequency decreasing with its height within the column;

means for having the observer dynamically receiving the events, according to the subscriptions and updating the display according to received events.

10. The platform according to claim 9, having a set of servers.

11. The platform according to claim 9, wherein a virtual zone, corresponds to a cell among cells of the first octree, and is handled by a particular server among the set of servers.

12. The platform according to claim 9, providing means for, when the load of a virtual zone is above a given threshold, the virtual zone is split into child virtual zones, each corresponding to child node of the node associated to the virtual zone in the first octree.

13. The platform according to claim 9, wherein the height parameter depends dynamically on an assessment of the load of the platform.

* * * * *